United States Patent
Katayama et al.

(10) Patent No.: US 8,221,686 B2
(45) Date of Patent: Jul. 17, 2012

(54) PARTICLE MANUFACTURING DEVICE

(75) Inventors: Erika Katayama, Mito (JP); Shigenori Togashi, Abiko (JP); Yukako Asano, Kashiwa (JP); Tetsuro Miyamoto, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 12/702,872

(22) Filed: Feb. 9, 2010

(65) Prior Publication Data

US 2010/0202930 A1 Aug. 12, 2010

(30) Foreign Application Priority Data

Feb. 10, 2009 (JP) .................. 2009-027978

(51) Int. Cl.
*B01J 19/00* (2006.01)
(52) U.S. Cl. ........................ 422/108; 422/603
(58) Field of Classification Search .......... 422/108, 422/603
See application file for complete search history.

(56) References Cited

U.S. PATENT DOCUMENTS

| | | | | |
|---|---|---|---|---|
| 6,244,738 | B1 * | 6/2001 | Yasuda et al. ............ | 366/114 |
| 7,401,970 | B2 * | 7/2008 | Komori et al. ............ | 366/108 |
| 7,938,947 | B2 * | 5/2011 | Sakata et al. ............ | 204/600 |
| 7,942,568 | B1 * | 5/2011 | Branch et al. ............ | 366/127 |
| 2005/0036921 | A1 | 2/2005 | Nagasawa et al. | |
| 2009/0269251 | A1 | 10/2009 | Asano et al. | |

FOREIGN PATENT DOCUMENTS

| | | |
|---|---|---|
| JP | 2004-337649 | 12/2004 |
| JP | 2005-046651 | 2/2005 |
| JP | 2005-125280 | 5/2005 |
| JP | 2007-069137 | 3/2007 |
| JP | 2007-098237 | 4/2007 |
| JP | 2007-204298 | 8/2007 |
| JP | 2008-029947 | 2/2008 |
| JP | 2008-080306 | 4/2008 |
| JP | 2008-093498 | 4/2008 |
| JP | 2008-290038 | 12/2008 |
| JP | 2009-061382 | 3/2009 |
| JP | 2009-262106 | 11/2009 |

OTHER PUBLICATIONS

JP Office Action of Appln. No. 2009-027978 dated Dec. 20, 2011.

\* cited by examiner

*Primary Examiner* — Walter D Griffin
*Assistant Examiner* — Huy-Tram Nguyen
(74) *Attorney, Agent, or Firm* — Antonelli, Terry, Stout & Kraus, LLP.

(57) ABSTRACT

A particle manufacturing device for manufacturing a particle by mixing a plural number of fluids, thereby manufacturing a particle, being uniform in the size or particle diameter thereof, with stability comprises a mixing channel portion, which is configured to mix the plural number of fluids therein, a residence channel portion, which is connected with the mixing channel portion in series, and in which the particles manufactured in the mixing channel portion reside, a sensor mechanism, which is configured to sense at least a condition of the residence channel portion, and an agitation giving mechanism, which is configured to give an agitation to the residence channel portion, upon basis of the condition, which is detected by the sensor mechanism.

12 Claims, 5 Drawing Sheets

PARTICLE MANUFACTURING DEVICE

CLAIM OF PRIORITY

This application relates to and claims priority from Japanese Patent Application No. 2009-027978 filed on Feb. 10, 2009, the entire disclosure of which is incorporated herein by reference.

BACKGROUND OF THE INVENTION

The present invention relates to a device for manufacturing particles through chemical reaction of a plural number of fluids within a channel.

In recent years, reaches or developments are made, extensively, upon a device for mixing the fluids within a channel, which is manufactured by a micro fabrication technology, i.e., so-called a micro-reactor, for applying it into a bio/medical field. As the distinctive features of the micro-reactor, the following can be listed up; (1) enabling to conduct temperature control, accurately and efficiently; (2) enabling to mix the fluids under a laminar flow; and (3) mixture can progress rapidly because of short diffusion length of material, etc. With utilizing those features, in recent years, an action is made actively, in particular, of applying the micro-reactor onto a particle formation process of an order of nanometer with a liquid-state formation method. In case when generating a uniform particle, it is necessary to control the processes of nucleation generating, particle growth, and aggregation. Because the particle diameter is fluctuated if a difference is generated in timing for a nucleation forming or a time for particle growth. With the conventional batch method for mixing the fluids with using a mechanical stirrer, it is difficult to manufacture a certain amount of the particles with stability, being uniform in the particle diameter thereof. Because there is unevenness of density and/or non-uniformity of temperature in the vessel, the synthesis condition of particle is not constant. Then, with applying the micro-reactor therein, since it enables quick and uniform mixture in a stage for generating the core, and since it also brings a time to be constant in a stage for the particle growth, it is possible to generate a mono-disperse particle, being equal in the particle diameter, continuously. However, when particles are generated within a minute channel, then those particles adhere and accumulate within the channel due to precipitation or aggregation, and they clog the channel finally. For that reason, it is difficult to use it for a log time, continuously.

Then, for dissolving such drawback, in the following Patent Document 1 is disclosed the structures, wherein a plural number of fluid-supply channels communicating with one (1) channel are combined in a coaxial multi-lamination structure, so as to use an inactive fluid, not participating directly on the reaction, and thereby the precipitation or the aggregation can hardly adhere and accumulate on a channel wall of a mixing channel portion. Also, in the following Patent Document 2 is disclosed a method of conducting surface coating on an inner wall of a micro-channel, with a functional group, so as to make hydrophobic or hydrophilic. Therefore, the adhesion and accumulation of the particles on the channel wall can suppress effectively. Further, in the following Patent Document 3 is disclosed a method for suppressing the clogging of the channel, by detecting a clog or an indication (or a sign) thereof with using a pressure sensor, so as to atomize a reaction product adhering on the channel wall through irradiation of ultrasonic wave, and thereby exfoliating the reaction product adhering on the channel wall.

PRIOR ART DOCUMENTS

Patent Documents

[Patent Document 1] Japanese Patent Laying-Open No. 2005-46651 (2005);
[Patent Document 2] Japanese Patent Laying-Open No. 2005-125280 (2005); and
[Patent Document 3] Japanese Patent Laying-Open No. 2004-337649 (2004).

BRIEF SUMMARY OF THE INVENTION

In the above-mentioned Patent Document 1 is disclosed the structures for avoiding the clog caused due to adhesion of the particles, the inactive fluid, which is not participating directly on the reaction is running in vicinity of the channel wall surface within the mixing channel portion for mixing the plural kinds of fluids. However, in this case, it is necessary to prepare the inactive fluid, not participating directly on the reaction, separately.

On the other hand, in the above-mentioned Patent Document 2 is disclosed the structures for suppressing the particles from adhering on the channel wall surface with the surface coating thereon within a residence channel. However, an effect of the surface coating, differs depending on a kind of the production, then it must be changed depending upon a reaction system.

In the above-mentioned Patent Document 3, since the ultrasonic wave is irradiated on, not only the residence channel, but also the mixing channel portion. Therefore, the flow in the mixing channel portion which should be uniformly mixed isn't the laminar flow. Then flow of a mixing fluid is disturbed, and thereby reducing the effect of the uniform mixture. Also, in case of the mixing channel portion being made up with a plural number of parts or members thereof, because of a reaction system having a fast reaction velocity, the mixing channel portion must be disassembled for cleaning every time when the particles glow up so that clogging is generated in the mixing channel.

According to the present invention, accomplished by taking the drawbacks of the conventional arts mentioned above into the consideration thereof, an object thereof is to provide a particle manufacturing device enabling to manufacture a particle uniform in the particle size or diameter thereof, with stability.

According to the present invention, for accomplishing the object mentioned above, there is provided a particle manufacturing device for manufacturing a particle by mixing a plural number of fluids, comprising: a mixing channel portion, which is configured to mix said plural number of fluids therein; a residence channel portion, which is connected with said mixing channel portion in series, and in which the particles manufactured in said mixing channel portion reside; a sensor mechanism, which is configured to sense at least a condition of said residence channel portion; and an agitation giving mechanism, which is configured to give an agitation to said residence channel portion, upon basis of the condition, which is detected by said sensor mechanism.

Or, alternatively, there is provided a particle manufacturing device for manufacturing a particle by mixing a plural number of fluids in a mixing channel portion, comprising: a residence channel portion, in which the particles manufactured in said mixing channel portion reside; a sensor mechanism, which is configured to sense at least a value of pressure in said residence channel portion; and an agitation giving mechanism, which is configured to give an agitation to said residence channel portion, upon basis of the value, which is detected by said sensor mechanism.

Further, according to the present invention, the particle manufacturing device, described in the above, further comprises a temperature control mechanism, which is configured to control temperature of the fluid in said mixing channel portion.

Further, according to the present invention, the particle manufacturing device, described in the above, further comprises a power control mechanism, which is configured to switch a power source of said agitation giving mechanism.

Further, according to the present invention, in the particle manufacturing device described in the above, said agitation giving mechanism gives agitation to a wall surface of said residence channel portion.

Further, according to the present invention, in the particle manufacturing device described in the above, a wall surface of said mixing channel portion is made up with parts for shielding the agitation from said agitation giving mechanism.

Also, according to the present invention, for accomplishing the object mentioned above, there is further provided a particle manufacturing device for manufacturing a particle by mixing a plural number of fluids, comprising: a mixing channel portion, which is configured to mix said plural number of fluids therein; a residence channel portion, which is connected with said mixing channel portion in series, and in which the particles manufactured in said mixing channel portion reside; a temperature control mechanism, which is configured to control temperature of fluid in said mixing channel portion; a pressure sensor mechanism, which is configured to sense a value of at least pressure in said residence channel portion; an agitation giving mechanism, which is configured to give an agitation to said residence channel portion, upon basis of the value, which is detected by said pressure sensor mechanism; and a power control mechanism, which is configured to switch a power source of said agitation giving mechanism.

According to the present invention mentioned above, it is possible to manufacture a particle, being uniform in the particle size or diameter thereof, with stability.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

First of all, explanation will be made on an embodiment 1. By referring to FIG. 1, the explanation will be given about the particle manufacturing device according to the embodiment 1. In each of a raw material tank 101a and a raw material tank 101b is contained or reserved therein a raw material, respectively. The raw material reserved in the raw material tank 101a is transferred or supplied to a mixing channel portion 106, by pumps 102a and 102b, passing through introduction tubes 103a and 103b. Herein, preferably, as the pumps 102a and 102b may be applied a syringe pump or a gear pump, or a plunger pump, etc., or selectively depending on a purpose thereof. The fluid mixed in the mixing channel portion 106, after passing through an induction tube 107, is supplied to a residence channel 108, wherein a particle grows up. The fluid including the particles manufactured is reserved in a fluid tank 111 after passing through an induction tube 110. Materials to be used in the induction tubes 103, 107 and 110, the mixing channel portion 106 and the residence channel portion 108 may be changed, appropriately, depending on a kind of reaction, as far as it does not give an ill influence upon that reaction. For example, at least one of stainless, silicon, glass, Hastelloy and silicon resin, etc., may be used, or a coating may be formed on the surface of those materials, with using a coating agent or material. Herein, the mixing channel portion 106 may be provided within a thermostatic bath 105, while being filled up with a heat media in an inside thereof, so as to perform a temperature control. Or, alternately, a Peltier device may be provided on an outside of the mixing channel portion 106.

Figure 1:
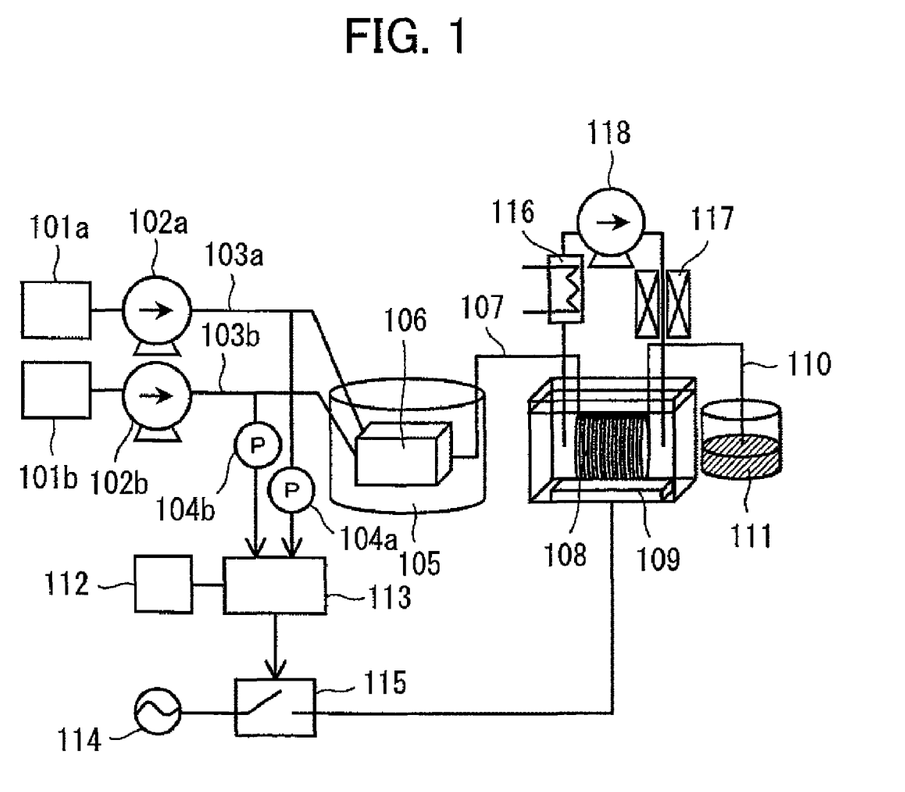
FIG. 1 is a view for showing the entire configuration of a particle manufacturing device, according to an embodiment of the present invention.

In a reaction system having a fast reaction velocity, for the purpose of preventing the particles growing up in the reaction mixing channel portion 106 from adhering on the wall surface of the channel, i.e., not to be accumulated thereon, it is necessary to slow down the reaction velocity by lowering the temperature of the thermostatic bath 105. On the other hand, in a reaction system having a slow reaction velocity, for the purpose of growing up the particles in the residence channel portion 108, with stability, it is necessary to quicken the reaction velocity by increasing the temperature of the thermostatic bath 105. In the residence channel portion 108, length of the tube thereof is determined upon, not only the temperature, but also a speed of supplying a liquid in balance therebetween, so that the reaction can proceed therein, fully.

A pressure sensor 104, being used as a detection mechanism therein, detects the condition in the channel, e.g., in the induction tubes 103, 107 and 110, or in the mixing channel portion and the residence channel portion 108. Herein, the detection mechanism for detecting the clogging should not be limited to the pressure sensor 104, but may be applied an optical sensor in the place thereof. Also, the detection mechanism may be disposed, should not be limited into the induction tube 103, but in the induction tubes 107 and 110, or in the residence channel portion 108. Herein, when no abnormality occurs in the channel because of supply of the raw material at a constant supply speed, the pressure measured by the pressure sensor 104 shows an almost constant value. But, if there is the clogging or an indication the clogging, since the cross-section of the channel is reduced due to adhesion/accumulation of the particles, the pressure indicated by the pressure sensor 104 goes up. Therefore, the value indicated by the pressure sensor 104 is compared with a preset steady value, and if it exceeds a permissive range, then this means that the clogging or the indication of clogging is detected. In case when detecting the clogging or the indication of clogging, a signal indicating of this is transmitted to a power supply controller device 113 of ultrasonic generator, so as to operate an ultrasonic generator 109 through a power supply switch 115 of ultrasonic generator, which is connected with a power source 114 of ultrasonic generator. In this instance, since the temperature of the mixing channel portion 106 goes up due to irradiation of the ultrasonic wave, it is necessary to conduct the temperature control upon the fluids filling up within the ultrasonic generator 109, with using a cooler 116, a heater 117, and a pump 118, etc. Further, if irradiating the ultrasonic wave continuously thereon for a long time, flow within the residence channel portion 108 is disturbed, and this increases the frequency of particle collision among the particles produced, and thereby accelerating aggregation. For that reason, it is preferable to repeat turning the ultrasonic generator 109 between "ON" and "OFF", for every several seconds. Those operations are performed by the power supply controller device 113 of ultrasonic generator, upon basis of an output value of a timer 112.

Figure 2:
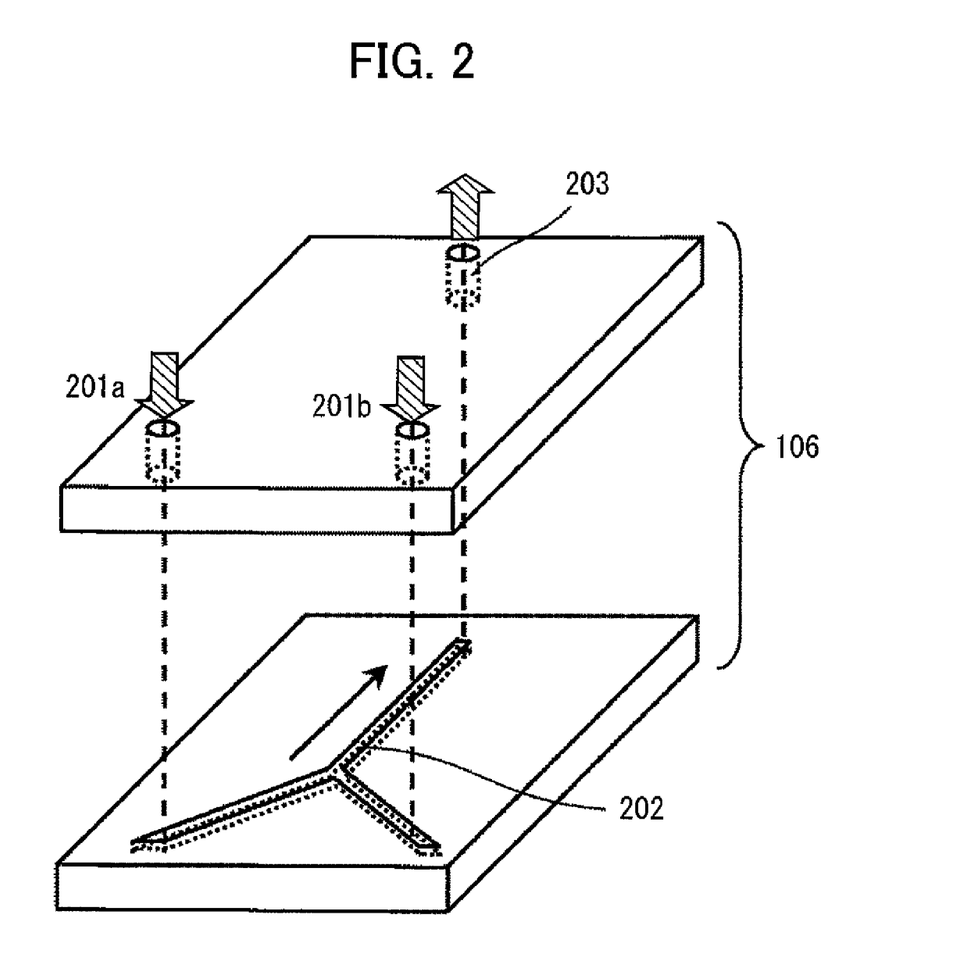
FIG. 2 is an explosive perspective view for showing the structure of a mixing channel portion of the particle manufacturing device.

FIG. 2 is a diagram for showing the structure of the mixing channel portion 106. The raw material supplied from the raw material tank 101 via the induction tube 103, after passing through the fluid introduction tubes fluid introductory parts 201a and 201b, is combined within a mixing channel 202, and is guided out from a fluid emissary part 203, which is connected with the introduction tube 107. Within the mixing channel 202 in the mixing channel portion 106, since the flow in a mainstream direction is dominant, it builds up a stable condition of laminar flow, without receiving an influence of vibration. Herein, in this mixing channel portion 106, the channels should not be limited to those for mixing up two (2) kinds of solutions, necessarily, but there may be held channels for mixing up three (3) or more kinds of solutions, or a multilayered channel of those channels.

Figure 3:
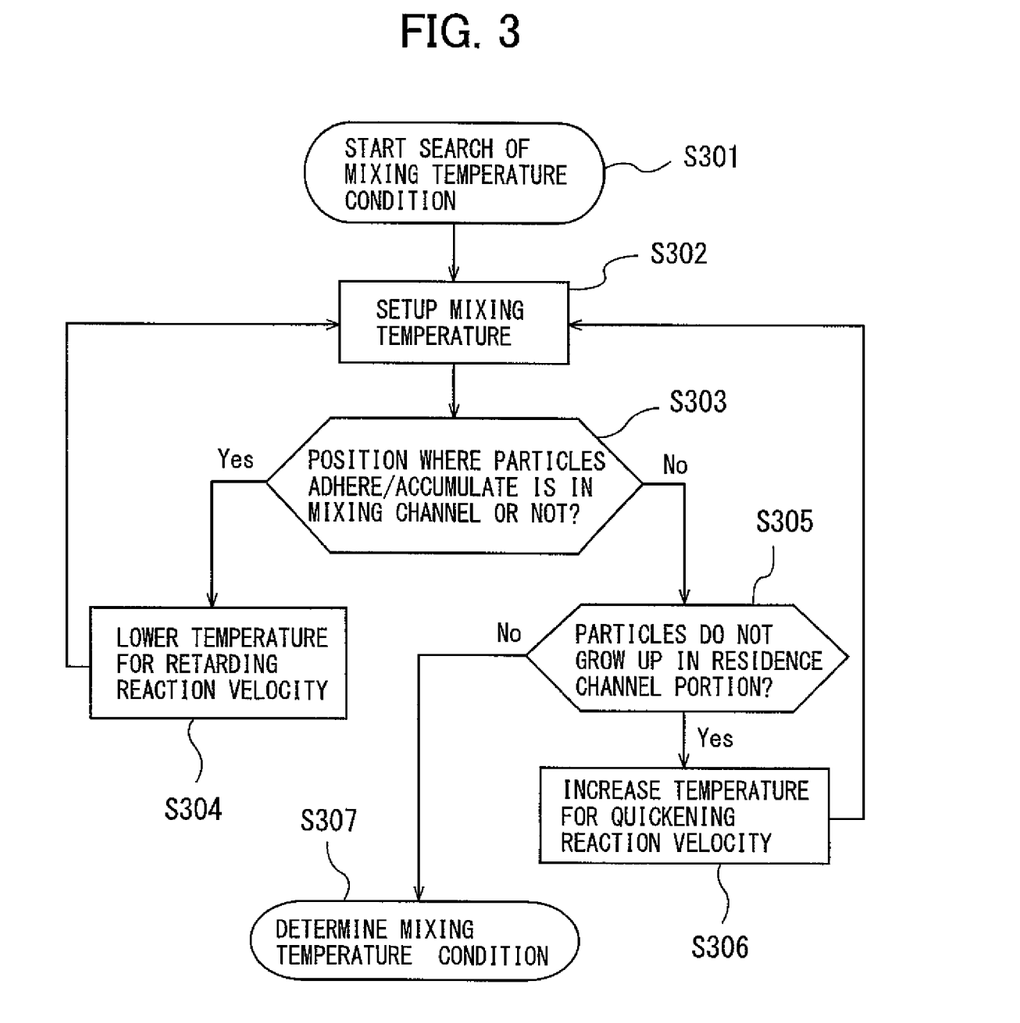
FIG. 3 is a flowchart for showing a temperature condition search algorithm for the mixing channel portion.

Next, explanation will be given on a preset temperature condition search algorithm of the thermostatic bath 105, in which the mixing channel portion 106 is provided, by referring to FIG. 3. Herein, the preset temperature condition search algorithm is prepared for searching out a preset temperature, to control the reaction velocity of particles, and thereby growing up the particles in the residence channel portion 108. Herein, is utilized a characteristic of a chemical reaction; i.e., when the temperature goes down, the reaction becomes slow, while the reaction comes to be fast when the temperature goes up. Firstly, search is started for a mixing temperature condition (S301). Next, the mixing temperature is setup (S302). Herein, observation is made on whether the position where the particles adhere and accumulate on the channel wall surface is within the mixing channel portion 206 or not (S303). In case that the position where the particles adhere and accumulate on the channel wall surface is within the mixing channel portion 206 (in S303), then the mixing temperature is fallen down (S304), since the reaction velocity is too fast. Or, in case that the position where the particles adhere and accumulate on the channel wall surface is not within the mixing channel portion 206 (in S303), then it is observed on whether the particles grows up or not, within the residence channel portion 108 (S305), too. In case where the particles do not grow up in the residence channel portion 108, then the mixing temperature is increased (S306), for the purpose of quickening the reaction velocity since the reaction velocity is too slow. Also, when growing of the particles can be observed in the residence channel portion 108, then the mixing temperature set up in the step S302, then it can be considered that the mixing temperature is appropriate or suitable, then the mixing temperature condition is determined (S307).

Figure 4:
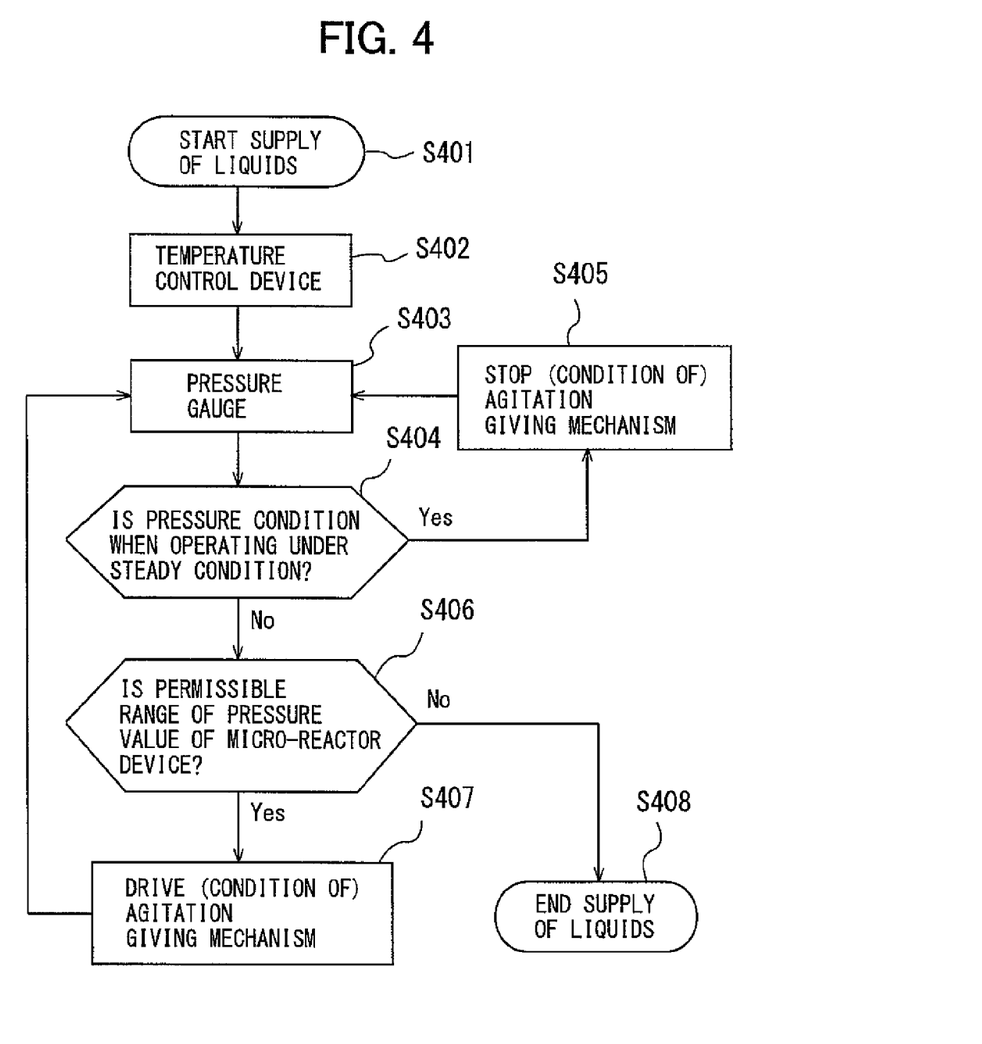
FIG. 4 is a flowchart for showing a control algorithm of an agitation giving mechanism, according to an embodiment 1

Next, explanation will be given on a control algorithm of an agitation giving mechanism according to the embodiment 1, by referring to FIG. 4. Upon execution of the control algorithm of the agitation giving mechanism shown in FIG. 4, firstly is started the supply of liquid (S401). Next, the temperature control device is set up with the mixing temperature condition 307, which is determined in FIG. 3 mentioned above (S402). Measurement is made on pressure by means of a pressure measuring device (S403). In case where it satisfies the pressure condition when operating in a steady motion having a certain constant range (S404), the agitation giving mechanism is stopped or maintained under the stopping condition thereof (S405), since there can be considered no clogging nor an indication thereof. In case where it does not satisfies the pressure condition when operating in the steady motion (S404), then it is determined on whether a permissible pressure condition of the device is satisfied or not (S406). This permissible pressure condition of the device is determined by taking a resist pressure of the pump 102 and/or a resist pressure of the mixing channel portion 106 into the consideration thereof. In case where the permissible pressure condition of the device is not satisfied (S406), the supply of liquid is ended (S408). In this instance, when clog is generated within the mixing channel portion 106, it is necessary to conduct disassembling/rinsing on the mixing channel portion 106. When the permissible pressure condition of the device is satisfied (S406), then the agitation giving mechanism is operated or maintained under the operating condition 307 thereof (S407).

Figure 5:
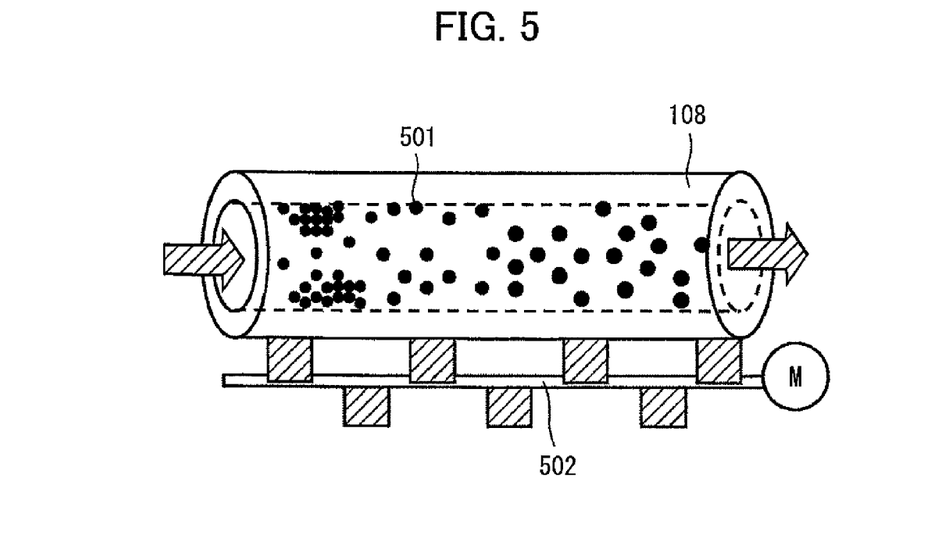
FIG. 5 is a perspective view for showing the agitation giving mechanism, according to an embodiment 2.

Explanation will be given on an embodiment 2, by referring to FIG. 5. This FIG. 5 shows the agitation giving mechanism of the residence channel portion 108. Since the particles 501 grow up in the residence channel portion 108 due to the temperature control of the mixing channel portion 106, they are in such a condition that they can easily adhere and accumulate on the channel wall surface of the residence channel portion 108. Then, there can be considered a method of providing another agitation giving mechanism 502, other than the ultrasonic generator 109, as the agitation giving mechanism. As this agitation giving mechanism 502 may be considered a device, for generating mechanical agitation or vibration by means of a member, which contacts on the channel directly. Or, as other example, the channel wall surface may be shaken artificially, for example.

Figure 6:
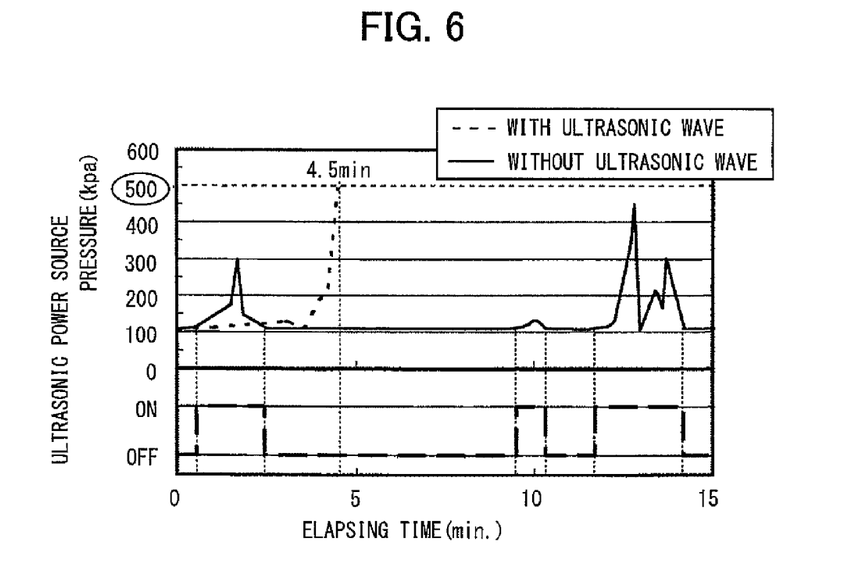
FIG. 6 shows a graph for showing a comparing between experimental results when irradiating an ultrasonic wave thereon and not.

Detailed explanation will be given on results obtained by experiments, by referring to FIG. 6. In the raw material tank 101a is reserved a silver nitrate solution of 0.05 mol/l. In the raw material tank 101b is reserved a sodium chloride solution of 0.05 mol/l. In the mixing channel portion 106 are formed a multilayered channel paralleling 48 layers, and it is provided within the thermostat bath 105 of 20° C. Also, the residence channel portion 108 is provided within the ultrasonic generator 109, being filled up with a fluid, which is set at 20° C. in the same manner. When supplying the two (2) liquids from the raw material tanks 101a and 101b, respectively, as 1 ml/min, for example, the pressure when operating under the steady motion, the pressure is 106 kPa, then a permissible range of the pressure condition when operating under the steady motion is set up from 100 to 120 kPa, for example. Also, the permissible pressure condition of the device is set at 500 kPa, for example. When conducting an experiment, i.e., supplying the liquids, but without operating the ultrasonic generator 109, then the pressure exceeds the permissible pressure condition 406 after passing 4.5 minutes, then the operation is stopped. In that instance, observation is made on a movement of the particles 501 produced within the residence channel portion 108, adhering and accumulating at the position 3 cm behind from an exit of the mixing channel portion 106. On the other hand, with using the ultrasonic generator 109 therein, the clogging or the indication of clogging is detected, three (3) times, during the time when it operates for 15 minutes. However, since the agitation or vibration is given on the channel wall surface of the residence channel portion 108 through irradiation of the ultrasonic wave, in any case, the particles 501 adhering and accumulating on the channel wall surface are exfoliated, and thereby avoiding the clogging. And, even after the operation of 15 minutes thereof, the pressure never exceeds the permissible pressure condition of the device. Also, in the similar manner to that of the case where irradiating no ultrasonic wave thereon, no adhesion and accumulation of the particles 501 cannot be found on the channel wall surface within 3 cm from the exit of the mixing channel portion 106.

As was explained in the above, according to the embodiment 2, it can be considered that the temperature of the fluids within the mixing channel portion 106 is controlled by the thermostat bath 105 and thereby it is possible to control a particle growth velocity of the particles 501. Further, it is also clear that, with an effect of agitation giving through irradiation of the ultrasonic wave, it is possible to exfoliate the particles adhering and accumulating on the wall surface of the channel, and therefore the device is durable for a long time use. Further, when estimating the particles 501 produced with using a laser diffraction particle size analyzer, it is confirmed that the results obtained are consistent with, in the particle size and the distribution of sizes thereof, between when irradiating no ultrasonic wave and when irradiating the ultrasonic wave thereon.

With the structures of the embodiments 1 and 2, within the device for producing particles, continuously, with mixing a plural number of fluids within the channel, it is possible (1) to exfoliate the particles adhering and accumulating on the channel wall surface, and thereby avoiding the clogging, (2) to achieve a control on the reaction velocity, so that a residence channel portion can be obtained, on which no disassembling/rinsing is necessary at the position thereof where the particles produced adhere and accumulate, in various kinds of reaction systems, and (3) to manufacture the particles, being uniform in the particle size or diameter thereof, while achieving a uniform mixture of the plural number of fluids within the mixing channel portion, at the same time.

Further, within the device for composing particles with mixing up a plural number of fluids in the channel, continuously, it is possible to control the reaction velocity, by controlling the temperature of the fluids within the mixing channel portion at a specific value corresponding to a reaction system. For this reason, with setting up the temperature in such a manner that the particles can grow up within the residence channel portion, it is possible to estimate the position where the particles adhere on the wall surface of the channel and accumulating thereon. Also, with giving the agitation or vibration onto the wall surface of the channel of the residence channel portion, it is possible to exfoliate the particles adhering and accumulating on the wall surface of the channel, and thereby suppressing the clogging. In this instance, since the wall surface of the mixing channel portion is made of a material for shielding the agitation or vibration generated by the agitation giving mechanism, it is possible to carry out a uniform mixture under the stable laminar flow, and thereby manufacturing a uniform particle.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A particle manufacturing device for manufacturing a particle by mixing a plural number of fluids, comprising:
   a mixing channel portion, which is configured to mix said plural number of fluids therein;
   a residence channel portion, which is connected with said mixing channel portion in series, and in which the particles manufactured in said mixing channel portion reside;
   a sensor mechanism, which is configured to sense at least a condition of said residence channel portion; and
   an agitation giving mechanism, which is configured to give an agitation to only said residence channel portion, upon basis of the condition, which is detected by said sensor mechanism.

2. The particle manufacturing device, described in the claim 1, further comprising:
   a temperature control mechanism, which is configured to control temperature of the fluid in said mixing channel portion.

3. The particle manufacturing device, described in the claim 1, further comprising:
   a power control mechanism, which is configured to switch a power source of said agitation giving mechanism to turn the agitation giving mechanism on or off, upon basis of the value, which is detected by said sensor mechanism.

4. The particle manufacturing device, described in the claim 1, wherein
   said agitation giving mechanism gives agitation to a wall surface of said residence channel portion.

5. The particle manufacturing device, described in the claim 4, wherein
   a wall surface of said mixing channel portion is made up with parts for shielding the agitation from said agitation giving mechanism.

6. A particle manufacturing device for manufacturing a particle by mixing a plural number of fluids in a mixing channel portion, comprising:
   a residence channel portion, in which the particles manufactured in said mixing channel portion reside;
   a sensor mechanism, which is configured to sense at least a value of pressure in said residence channel portion;
   an agitation giving mechanism, which is configured to give an agitation to said residence channel portion; and
   a control mechanism for turning the agitation giving mechanism on or off, upon basis of the value, which is detected by said sensor mechanism.

7. The particle manufacturing device, described in the claim 6, further comprising:
   a temperature control mechanism, which is configured to control temperature of the fluid in said mixing channel portion.

8. The particle manufacturing device, described in the claim 6, wherein:
   the control mechanism for turning the agitation giving mechanism on or off is a power control mechanism, which is configured to switch a power source of said agitation giving mechanism.

9. The particle manufacturing device, described in the claim 6, wherein
   said agitation giving mechanism gives agitation to a wall surface of said residence channel portion.

10. The particle manufacturing device, described in the claim 9, wherein a wall surface of said mixing channel portion is made up with parts for shielding the agitation from said agitation giving mechanism.

11. A particle manufacturing device for manufacturing a particle by mixing a plural number of fluids, comprising:

a mixing channel portion, which is configured to mix said plural number of fluids therein;

a residence channel portion, which is connected with said mixing channel portion in series, and in which the particles manufactured in said mixing channel portion reside;

a temperature control mechanism, which is configured to control temperature of fluid in said mixing channel portion;

a pressure sensor mechanism, which is configured to sense a value of at least pressure in said residence channel portion;

an agitation giving mechanism, which is configured to give an agitation to said residence channel portion, upon basis of the value, which is detected by said pressure sensor mechanism but not to said mixing channel portion; and a power control mechanism, which is configured to switch a power source of said agitation giving mechanism.

12. The particle manufacturing device, described in the claim 11, wherein:

the power control mechanism, which is configured to switch the power source of said agitation giving mechanism, is configured to turn the agitation giving mechanism on or off by switching the power source of said agitation giving mechanism.

* * * * *